(12) United States Patent
Sharma

(10) Patent No.: US 10,956,897 B2
(45) Date of Patent: Mar. 23, 2021

(54) SYSTEMS AND METHODS FOR TRANSFERRING BALANCES

(71) Applicant: MasterCard International Incorporated, Purchase, NY (US)

(72) Inventor: Aarti Sharma, Saint Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1096 days.

(21) Appl. No.: 14/798,540

(22) Filed: Jul. 14, 2015

(65) Prior Publication Data

US 2017/0017953 A1    Jan. 19, 2017

(51) Int. Cl.
*G06Q 20/34* (2012.01)
*G06Q 20/28* (2012.01)
*G06Q 20/40* (2012.01)

(52) U.S. Cl.
CPC ........... *G06Q 20/342* (2013.01); *G06Q 20/28* (2013.01); *G06Q 20/348* (2013.01); *G06Q 20/409* (2013.01)

(58) Field of Classification Search
CPC .... G06Q 20/342; G06Q 20/28; G06Q 20/409; G06Q 20/348
USPC ......................................................... 705/44
See application file for complete search history.

(56) References Cited

U.S. PATENT DOCUMENTS

| | | | | |
|---|---|---|---|---|
| 5,466,919 | A * | 11/1995 | Hovakimian | G06Q 20/10 235/380 |
| 7,050,554 | B2 | 5/2006 | Parfait et al. | |
| 7,809,641 | B2 * | 10/2010 | Sanders | G06Q 20/10 705/14.17 |
| 8,160,922 | B2 * | 4/2012 | Postrel | G06Q 30/02 705/14.19 |
| 8,438,098 | B2 | 5/2013 | Hamburg | |
| 8,676,704 | B2 * | 3/2014 | Ledbetter | G06Q 20/10 705/1.1 |
| 9,959,535 | B2 * | 5/2018 | Enzaldo | G06Q 20/28 |
| 2003/0007615 | A1 * | 1/2003 | Parfait | G06Q 20/28 379/114.2 |

(Continued)

OTHER PUBLICATIONS

Crane et al., "The Donation-Payment Gift Card Concept: How to Give Twice with One Card," arxiv.org/abs/physics/0510068, Oct. 9, 2005, last accessed Jul. 14, 2015.

*Primary Examiner* — Sara C Hamilton

(57) ABSTRACT

A positive balance on a first financial account associated with a prepaid card are transferrable to a second financial account associated with a third party. In some embodiments, an instruction to transfer a portion of the first financial account to the second financial account is received. The instruction is associated with one or more triggering events. The one or more triggering events are associated with an inactive amount of time associated with the prepaid card, an expiration date associated with the prepaid card, and/or a balance of the first financial account associated with the prepaid card. A first triggering event of the one or more triggering events is detected. Upon detection of the first triggering event, the portion of the first financial account is transferred to the second financial account. Aspects of the disclosure enable a processing system to identify one or more opportunities to liquidate and/or fund financial accounts in an organized, resource-efficient, and timely manner.

20 Claims, 5 Drawing Sheets

(56) References Cited

U.S. PATENT DOCUMENTS

| | | | | |
|---|---|---|---|---|
| 2003/0055780 A1* | 3/2003 | Hansen | ............... | G06Q 20/00 |
| | | | | 705/39 |
| 2003/0130895 A1* | 7/2003 | Antonucci | ......... | G06Q 30/0229 |
| | | | | 705/14.27 |
| 2004/0182922 A1* | 9/2004 | Talarico, Jr. | ........... | G06Q 20/28 |
| | | | | 235/380 |
| 2004/0199461 A1* | 10/2004 | Hansen | ............... | G06Q 20/10 |
| | | | | 705/39 |
| 2004/0249752 A1* | 12/2004 | Prato | ............... | G06Q 20/04 |
| | | | | 705/41 |
| 2005/0021363 A1* | 1/2005 | Stimson | ............. | G06Q 20/105 |
| | | | | 705/44 |
| 2007/0063020 A1* | 3/2007 | Barrafato | ........... | G06Q 20/3433 |
| | | | | 235/380 |
| 2007/0250389 A1* | 10/2007 | Holtz | ............... | G06Q 30/02 |
| | | | | 705/14.36 |
| 2009/0112762 A1* | 4/2009 | Hamburg | ............. | G06Q 20/105 |
| | | | | 705/41 |
| 2010/0082482 A1* | 4/2010 | VanDeburg | ............ | G06Q 20/10 |
| | | | | 705/42 |
| 2011/0010277 A1* | 1/2011 | Enzaldo | ............... | G06Q 20/04 |
| | | | | 705/30 |
| 2012/0022955 A1* | 1/2012 | Bracco | ............... | G06Q 20/105 |
| | | | | 705/16 |
| 2013/0254106 A1* | 9/2013 | Webber | ............ | G06O 30/0601 |
| | | | | 705/41 |
| 2014/0052634 A1* | 2/2014 | Baron | ............... | G06Q 20/227 |
| | | | | 705/44 |
| 2015/0302489 A1* | 10/2015 | Newbauer | .......... | G06Q 30/0279 |
| | | | | 705/39 |
| 2015/0324768 A1* | 11/2015 | Filter | ............... | G06Q 20/0655 |
| | | | | 705/38 |

* cited by examiner

SYSTEMS AND METHODS FOR TRANSFERRING BALANCES

BACKGROUND

At least some financial transactions are processed using prepaid cards. Known prepaid cards are associated with a financial account at a financial institution having a positive balance that allows a cardholder to make one or more purchases. Some prepaid cards may be used until there is a zero balance on the financial account (e.g., all of the money associated with the prepaid card account is spent). However, at least some cardholders may stop using the prepaid card before the balance on the financial account is fully depleted (e.g., a zero balance). For at least some of these prepaid cards, a positive balance on the financial account remains unused for at least some amount of time.

SUMMARY

Embodiments of the disclosure enable a positive balance on a first financial account associated with a prepaid card to be transferred to a second financial account associated with a third party, such as a charitable organization. In one aspect, a computer-implemented method for processing a financial transaction of the prepaid card is provided. The method includes using an interface component to prompt a cardholder to identify one or more triggering events and one or more triggered operations associated with the one or more triggering events. The one or more triggering events is associated with an inactive amount of time associated with the prepaid card, an expiration date associated with the prepaid card, and/or a balance of a first financial account associated with the prepaid card. The one or more triggered operations include transferring a portion of the first financial account to a second financial account associated with a third party. Information associated with the one or more triggering events and the one or more triggered operations is received. A monitor component is used to detect a first triggering event of the one or more triggering events and, upon detection of the first triggering event, a transfer component is used to transfer the portion of the first financial account to the second financial account.

In another aspect, a computing device configured to process a financial transaction of a prepaid card is provided. The computing device includes a memory storing data associated with a plurality of financial accounts and computer-executable instructions, and a processor configured to execute the computer-executable instructions to identify a portion of one financial account of the plurality of financial accounts associated with the prepaid card for donation to a charitable organization, detect a first triggering event of the one or more triggering events, and, upon detection of the first triggering event, transfer the portion of the one financial account to a financial account associated with the charitable organization. The donation is associated with one or more triggering events.

In yet another aspect, a computer-readable storage device having computer-executable instructions embodied thereon is provided. Upon execution by at least one processor, the computer-executable instructions cause the processor to identify a portion of a first financial account associated with a prepaid card for transfer to a second financial account associated with a third party, detect a first triggering event of the one or more triggering events, upon detection of the first triggering event, prompt a cardholder to confirm the transfer of the portion of the first financial account, and, upon receiving a confirmation of the transfer, transfer the portion of the first financial account to the second financial account. The transfer is associated with one or more triggering events. The one or more triggering events are associated with an inactive amount of time associated with the prepaid card, an expiration date associated with the prepaid card, and/or a balance of the first financial account associated with the prepaid card.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
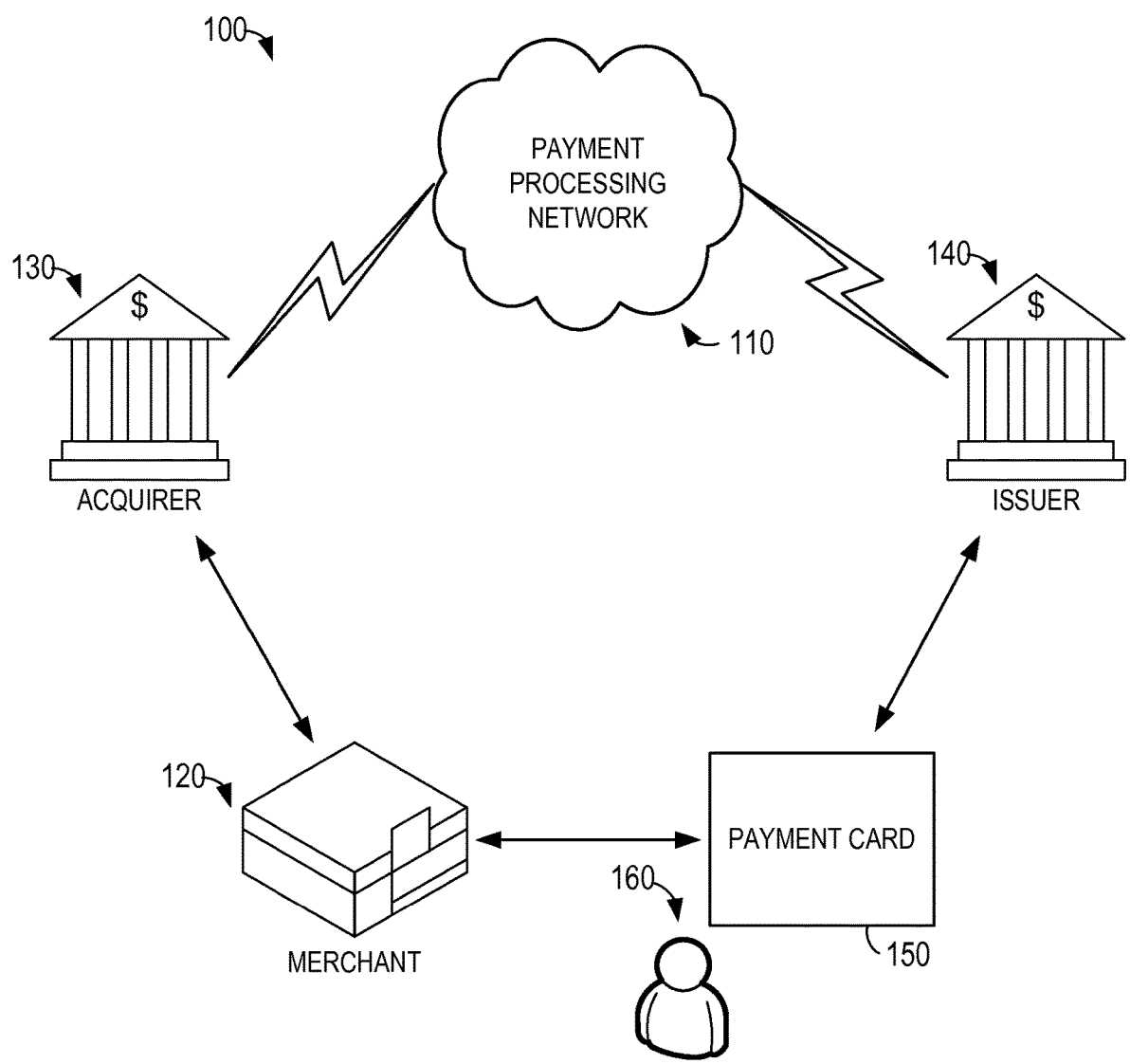
FIG. 1 is a block diagram illustrating an example environment for processing financial transactions.

The subject matter described herein relates generally to information processing and, more specifically, to processing a financial transaction between a plurality of parties. Embodiments of the disclosure provide the ability for a cardholder to transfer an amount up to a balance (e.g., a positive balance) on a prepaid card account to a financial account of a third party, such as a charitable organization, thereby enabling the third party to collect the positive balance. Embodiments described herein enable a computer system to identify a portion of a financial account for transfer to a third party, establish a triggering event for the transfer, detect the triggering event, and transfer the portion of the financial account to a financial account of the third party.

Aspects of the disclosure provide for a processing system to identify one or more opportunities to liquidate and/or fund a financial account in an organized, resource-efficient, and timely manner. For example, one or more triggering events may be used to initiate a transfer of a positive balance between a plurality of parties. In this way, the positive balance may be transferred in accordance with one or more defined parameters.

The methods and systems described herein may be implemented using computer programming or engineering techniques including computer software, firmware, hardware or a combination or subset thereof. As described above, at least one technical problem with known prepaid cards is that at least some financial accounts associated with known prepaid cards have a positive balance that remains unused for at least some amount of time. The systems and methods described herein address that technical problem. For example, by processing financial transactions in the manner described in this disclosure, some embodiments improve efficiency of processing financial transactions and usability of processing systems by defining parameters that dictate or facilitate the financial transactions, improve user efficiency via user interface interaction, enhance reliability of a data repository that stores or maintains financial accounts by actively managing the financial accounts, improve communication between disparate systems by creating a forum to share or access information, increase system functionality by building a robust network of disparate systems, and/or reduce error rate by automating the processing of financial transactions.

The technical effect of the systems and processes described herein is achieved by performing at least one of the following operations: a) prompting a cardholder to identify one or more triggering events and one or more triggered operations associated with the one or more triggering events; b) receiving information associated with the one or more triggering events and the one or more triggered operations; c) prompting the cardholder to identify a third party; d) receiving an identification of the third party; e) prompting the cardholder to identify a portion of a financial account; f) receiving an identification of the portion of the financial account; g) identifying the portion of the financial account for transfer to a financial account associated with the third party; h) prompting the cardholder to increase a balance of the financial account; i) receiving an indication to increase the balance; j) detecting a first triggering event of the one or more triggering events; k) prompting the cardholder to confirm the transfer of the portion of the financial account; l) transferring the portion of the financial account to the financial account associated with the third party; m) detecting a second triggering event of the one or more triggering events; and n) presenting a notification associated with the transfer of the portion of the financial account.

FIG. 1 is a block diagram illustrating an example environment or system 100 for processing financial transactions. The system 100 includes a processing network 110, such as the MasterCard® brand payment processing network (MasterCard® is a registered trademark of MasterCard International Incorporated located in Purchase, N.Y.). The MasterCard® brand payment processing network is a propriety network for exchanging financial transaction data between members of the MasterCard® brand payment processing network.

The system 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The system 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the processing network 110.

A cardholder 160 uses a payment product, such as a payment card 150, to purchase a good or service from a merchant 120. The cardholder 160 may use any payment card 150 that is linked or associated with a corresponding financial account maintained by an issuer 140. As described herein, the term "payment card" includes credit cards, debit cards, prepaid cards, digital cards, smart cards, and the like. Payment cards 150 may have any shape, size, or configuration that enables the system 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions, including e-commerce transactions, card-not-present transactions, or card-on-file transactions). Account information may include a name of the cardholder 160, an account number, an expiration date, a security code (such as a CVV or CVC), and/or a personal identification number (PIN).

The merchant 120 requests authorization from an acquirer 130 for at least the amount of the purchase. For example, the merchant 120 may request authorization through a point-of-sale (POS) terminal, which reads account information of the cardholder 160 from a microchip or magnetic stripe on the payment card 150 and transmits the cardholder's account information to one or more financial transaction processing computing devices of the acquirer 130.

Using the processing network 110, the financial transaction processing computing devices of the acquirer 130 communicate with one or more financial transaction processing computing devices of an issuer 140 to determine whether the account information of the cardholder 160 matches or corresponds with the account information of the issuer 140, whether the financial account is in good standing, and/or whether the purchase is covered by (e.g., less than) a credit line or account balance associated with the financial account. Based on these determinations, the financial transaction processing computing devices of the issuer 140 determine whether to approve or decline the request for authorization from the merchant 120.

If the request for authorization is declined, the merchant 120 is notified as such and may request authorization from the acquirer 130 for a lesser amount or request an alternative form of payment from the cardholder 160. If the request for authorization is accepted, an authorization code is issued to the merchant 120 and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer for reimbursing the merchant 120. When a credit card is used, the issuer 140 may bill the cardholder 160 to settle a financial account associated with the cardholder 160. When a debit or prepaid card is used, the issuer 140 may automatically withdraw funds from the financial account.

Figure 2:
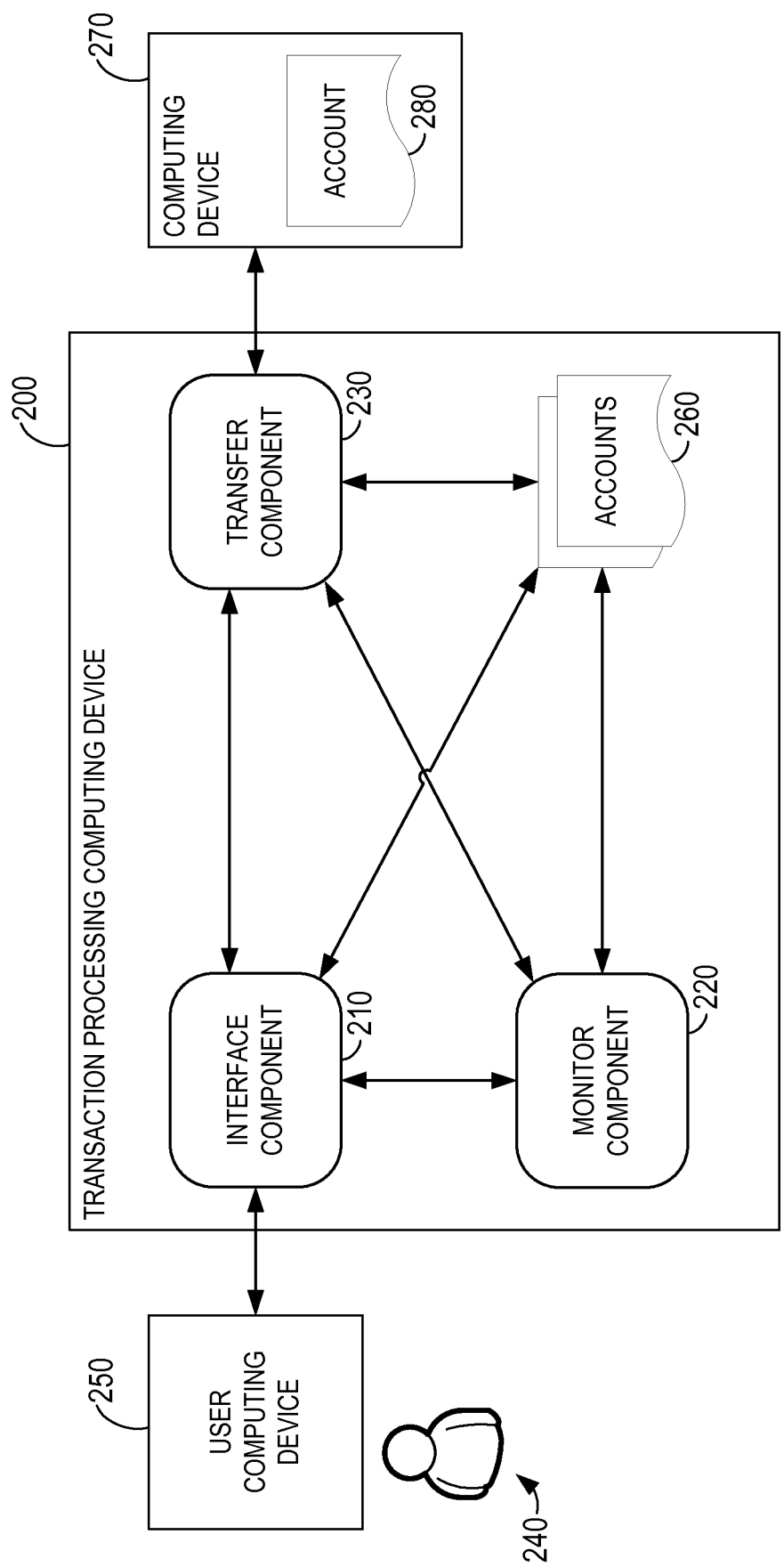
FIG. 2 is a block diagram illustrating example modules that may be used to process financial transactions in an environment, such as the environment shown in FIG. 1.

FIG. 2 is a block diagram illustrating example modules that may be used to process financial transactions in the system 100 (shown in FIG. 1) using a financial transaction processing computing device 200. In some embodiments, the financial transaction processing computing device 200 is associated with the issuer 140. Alternatively, the financial transaction processing computing device 200 may be associated with any entity that enables the system 100 to function as described herein. The financial transaction processing computing device 200 includes an interface component 210, a monitor component 220, and/or a transfer component 230.

The interface component 210 is configured to present information to a user 240 (e.g., cardholder 160), prompt the user 240 for information, and/or receive information from the user 240. In some embodiments, the interface component 210 is configured to communicate with the user 240 via a user computing device 250. In some embodiments, the interface component 210 is configured to determine whether additional information may be available from the user 240. For example, the interface component 210 may be configured to identify that at least some information is missing or unavailable at the financial transaction processing computing device 200 and, upon identifying that at least some information is unavailable at the financial transaction processing computing device 200, determine that the information may be available from the user 240. The interface component 210 may then prompt the user 240 for the information. For example, the user 240 may be prompted to fund a financial account 260 (e.g., increase an account balance), identify a portion of a financial account 260 to transfer to a financial account associated with a third party, identify a third party to transfer a portion of a financial account 260, identify a triggering event, identify a triggered operation, and/or confirm a request or instruction submitted by the user 240. Alternatively, the interface component 210 may communicate with the user 240 in any manner that enables the financial transaction processing computing device 200 to function as described herein.

In some embodiments, the third party (not shown in FIG. 2) is identified by the user 240 from a list of third parties (e.g., drop down menu). For example, the list of third parties may include one or more preapproved third parties including charitable organizations (e.g., 501(c)(3) organizations). The financial transaction processing computing device 200 includes or has access to account information associated with the preapproved third parties. Additionally or alternatively, the interface component 210 may receive a free-form text input from the user 240 to identify the third party. In some embodiments, the financial transaction processing computing device 200 is configured to determine whether the third party is a charitable organization. For example, the financial transaction processing computing device 200 may compare the inputted third party with a database of the one or more preapproved third parties to determine whether the inputted third party corresponds to or is related to a third party of the one or more preapproved third parties.

The monitor component 220 is configured to monitor one or more financial accounts 260 for one or more triggering events. Triggering events include a financial account 260 being in a dormant or inactive state (e.g., the payment card 150 and/or the financial account 260 have not used to process one or more financial transactions) for at least a predetermined amount of time, a predetermined date (e.g., expiration date) being reached or passed, and/or a balance of the financial account 260 being decreased to be equal to or less than a predetermined amount. In at least some embodiments, one or more triggering events are selected, input, and/or approved by the user 240 at setup or activation of a payment card 150 or a financial account 260 associated with the payment card 150 via the interface component 210. For example, upon setting up or activating the payment card 150 and/or the financial account 260, the interface component 210 may prompt the user 240 for information to establish one or more triggering events including identifying an inactive amount of time, identifying a date, and/or identifying a balance of the financial account 260. The monitor component 220 may establish or modify one or more triggering events based on information received from the user 240 (e.g., received via the interface component 210). Alternatively, the monitor component 220 may be configured to establish and/or detect any triggering event that enables the financial transaction processing computing device 200 to function as described herein.

The occurrence of a triggering event prompts the performance or execution of a triggered operation associated with the triggering event. The triggered operation may be performed immediately or a predetermined amount of time after determining the occurrence of the triggering event. For example, the predetermined amount of time may be an absolute time (e.g., on the first day of the next month) or a relative time (e.g., twenty four hours after the triggering event).

Triggered operations include funding a financial account 260, transferring a portion of the financial account 260 to a financial account associated with a third party (e.g., via the transfer component 230), identifying a third party, monitoring the financial account 260 for another triggering event, and/or confirming a request or instruction. Each triggering event may have a respective triggered operation. For example, dormancy of a financial account 260 or an approaching expiration date may be associated with a reminder to use a payment card 150 associated with the financial account 260, a reaching or passing of an expiration date may be associated with a transfer of the funds of the financial account 260 to a financial account associated with a third party, and/or an account balance falling below a predetermined threshold may be associated with a reminder to re-fund or add more funds to the financial account 260 or the transferring of the funds to the financial account of the third party.

Additionally or alternatively, the triggering event may have one or more triggered operations based on account information. For example, an approaching expiration date (e.g., a triggering event) may be associated with a triggered operation such as a reminder to use a payment card 150 associated with the financial account 260 when an account balance is greater than or equal to a predetermined threshold and associated with another triggered operation such as a transfer of the funds of the financial account 260 to a third party when the account balance is less than the predetermined threshold. Alternatively, the monitor component 220 may be configured to implement any triggered operation that enables the financial transaction processing computing device 200 to function as described herein.

In at least some embodiments, one or more triggered operations are selected, input, and/or approved by the user 240 at setup or activation of a payment card 150 or a financial account 260 associated with the payment card 150 via the interface component 210. For example, upon setting up or activating the payment card 150 and/or the financial account 260, the interface component 210 may prompt the user 240 for information to establish one or more triggered operations including transferring a portion of the financial account 260 to a third party (e.g., via the transfer component 230).

In some embodiments, the monitor component 220 is configured to determine a likelihood of the funds of a financial account 260 being used such that the funds may be managed based on the determination. In at least some embodiments, the likelihood of account funds being used may be determined based on account information including historical data. For example, the monitor component 220 may determine a likelihood of account funds being used based on whether one or more triggering events have occurred.

The transfer component 230 is configured to transfer funds between a plurality of financial accounts 260. For example, the transfer component 230 may transfer at least some funds to and/or from the financial account 260 based on information received from the user 240 (e.g., received via the interface component 210). For another example, the transfer component 230 may communicate with the monitor component 220 such that the transfer component 230 transfers at least some funds to and/or from the financial account 260 upon determination of a triggering event.

In some embodiments, the transfer component 230 is configured to transfer funds between a plurality of financial accounts 260 maintained at or by the financial transaction processing computing device 200. For example, the transfer component 230 may transfer funds from the cardholder's financial account 260 maintained at or by the financial transaction processing computing device 200 to a charitable organization's financial account 260 maintained at or by the financial transaction processing computing device 200. Additionally or alternatively, the transfer component 230 is configured to communicate with another computing device 270 (e.g., another financial transaction processing computing device) to transfer funds between a financial account 260 maintained at or by the financial transaction processing computing device 200 and a financial account 280 maintained at or by the other computing device 270. For example, the transfer component 230 may transfer funds from the cardholder's financial account 260 maintained at or by the financial transaction processing computing device 200 to a charitable organization's financial account 280 maintained at or by the other computing device 270.

In at least some embodiments, the transfer component 230 is configured to generate one or more documents confirming a transfer of funds between a plurality of financial accounts 260 and/or 280. For example, the transfer component 230 may identify a donation of funds to a charitable organization and, based upon the identification, generate a receipt confirming the donation to the charitable organization.

Figure 3:
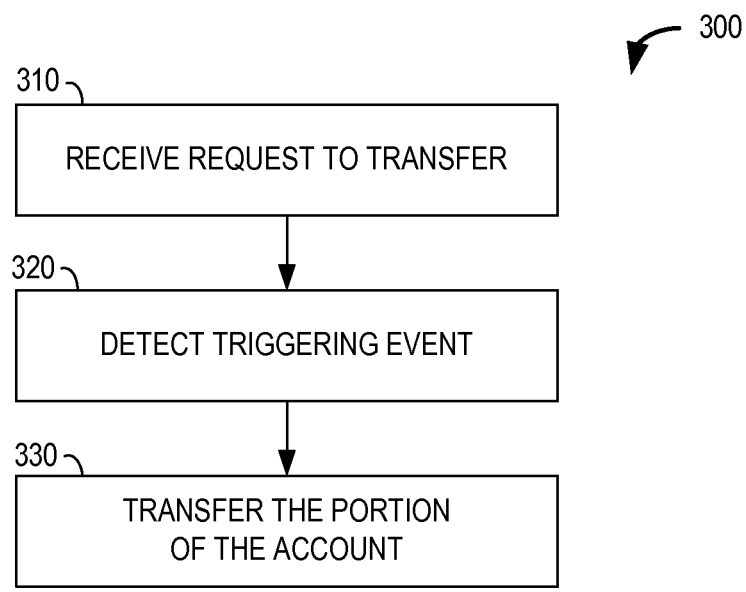
FIG. 3 is a flowchart of an example method of processing a financial transaction in an environment, such as the environment shown in FIG. 1.

FIG. 3 is a flowchart of an example method 300 of processing a financial transaction in the system 100 (shown in FIG. 1) using the financial transaction processing computing device 200 (shown in FIG. 2). A user 240 may setup or activate a payment card 150 by funding the financial account 260 associated with the payment card 150. The user 240 may be prompted to participate in a positive balance transfer program upon setting up or activating the payment card 150. For example, an instruction to transfer a portion of the financial account 260 to a third party, such as a charitable organization, is received from the user 240 at 310. The instruction may include or be received with an identification of the third party, an indication to increase a balance of the financial account 260, an identification of one or more triggering events, an identification of one or more triggered operations, an identification of the portion (e.g., a fixed or variable amount) to transfer to the third party, and/or an instruction to confirm a transfer. The financial transaction processing computing device 200 implements operations based on the received instruction, including establishing a triggering event associated with the transfer of the portion of the financial account 260 to a financial account associated with the third party.

The triggering event is detected at 320 and, upon detection of the triggering event, the portion of the financial account 260 is transferred to the financial account associated with the third party at 330. For example, the portion of the financial account 260 may be transferred to the financial account associated with the third party after a predetermined period of inactivity or dormant amount of time (e.g., twelve months). For another example, the portion of the financial account 260 may be transferred to the financial account associated with the third party at a predetermined date (e.g., expiration date). For yet another example, the portion of the financial account 260 may be transferred to the financial account associated with the third party upon an account balance decreasing below or become equal to a predetermined threshold (e.g., $1). Alternatively, the portion of the financial account 260 may be transferred to the financial account associated with the third party upon detecting any triggering event that enables the financial transaction processing computing device 200 to function as described herein.

Figure 4:
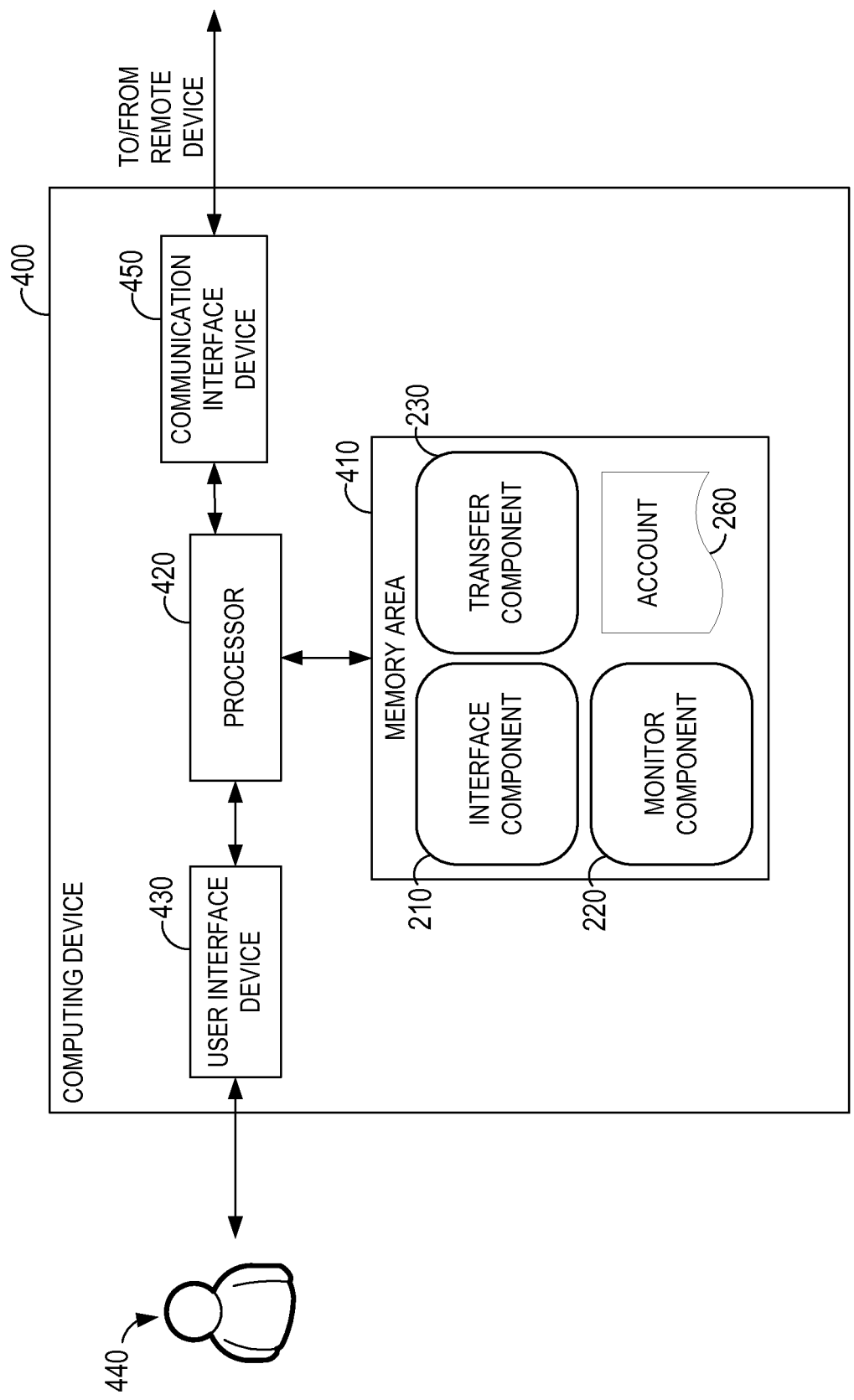
FIG. 4 is a block diagram illustrating an example computing device that may be used to process financial transactions in an environment, such as the environment shown in FIG. 1.

FIG. 4 is a block diagram illustrating an example computing device 400 that may be used to process financial transactions in the system 100 (shown in FIG. 1). While some embodiments of the disclosure are illustrated and described herein with reference to the computing device 400 being or including a financial transaction processing computing device 200 (shown in FIG. 2), a user computing device 250 (shown in FIG. 2), and/or a computing device 270 (shown in FIG. 2), aspects of the disclosure are operable with any computing device that executes instructions to implement the operations and functionality associated with the computing device 400.

For example, the computing device 400 may include a mobile device, a mobile telephone, a phablet, a tablet, a portable media player, a netbook, a laptop, a desktop computer, a computing pad, a kiosk, a tabletop device, an industrial control device, and other computing devices. Additionally, the computing device 400 may represent a group of processing units or other computing devices. Additionally, any computing device described herein may be configured to perform any operation described herein including one or more operations described herein as being performed by another computing device.

The computing device 400 includes one or more computer-readable media, such as a memory area 410 storing computer-executable instructions, an interface component 210, a monitor component 220, a transfer component 230, one or more financial accounts 260, account information, merchant information, financial institution information, purchase information, and other data, and one or more processors 420 programmed to execute the computer-executable instructions for implementing aspects of the disclosure. The memory area 410 includes any quantity of media associated with or accessible by the computing device 400. The memory area 410 may be internal to the computing device 400 (as shown in FIG. 4), external to the computing device 400 (not shown), or both (not shown).

The processor 420 includes any quantity of processing units, and the instructions may be performed by the processor 420 or by multiple processors within the computing device 400 or performed by a processor external to the computing device 400. The processor 420 is programmed to execute instructions such as those illustrated in the figures (e.g., FIGS. 3 and/or 5).

Upon programming or execution of these instructions, the processor 420 is transformed into a special purpose microprocessor or machine. For example, the interface component 210, when executed by the processor 420, causes the processor 420 to receive an instruction to transfer a portion of a financial account 260 to a financial account 260 or 280 associated with a third party; the monitor component 220, when executed by the processor 420, causes the processor 420 to detect a triggering event associated with the financial account 260; and the transfer component 230, when executed by the processor 420, causes the processor 420 to transfer the portion of the financial account 260 to the financial account 260 or 280 associated with the third party. Although the processor 420 is shown separate from the memory area 410, embodiments of the disclosure contemplate that the memory area 410 may be onboard the processor 420 such as in some embedded systems.

The computing device 400 includes at least one user interface 430 for exchanging data between the computing device 400 and a user 440 (e.g., cardholder 160). For example, the user interface 430 includes or is coupled to a presentation device configured to present information, such as text, images, audio, video, graphics, alerts, and the like, to the user 440. The presentation device may include, without limitation, a display, a speaker, or a vibrating component. Additionally or alternatively, the user interface 430 includes or is coupled to an input device (not shown) configured to receive information, such as user commands, from the user 440. The input device may include, without limitation, a controller, a camera, a microphone, or an accelerometer. In at least some embodiments, the presentation device and the input device are integrated in a common user interface 430 configured to present information to the user 440 and receive information from the user 440. For example, the user-interface device may include, without limitation, a capacitive touch screen display or a controller including a vibrating component. In some embodiments, the user 440 may interface with the computing device 400 via another computing device.

The computing device 400 includes at least one communication interface 450 for exchanging data between the computing device 400 and a computer-readable media or another computing device. For example, the computing device 400 may be coupled to a server, a financial transaction processing computing device, a user computing device, and/or a point-of-sale (POS) terminal via a network and/or the Internet. Communication between the computing device 400 and a computer-readable media or another computing device may occur using any protocol or mechanism over any wired or wireless connection.

The block diagram of FIG. 4 is merely illustrative of an example system that may be used in connection with one or more embodiments of the disclosure and is not intended to be limiting in any way. Further, peripherals or components of the computing devices known in the art are not shown, but are operable with aspects of the disclosure. At least a portion of the functionality of the various elements in FIG. 4 may be performed by other elements in FIG. 4, or an entity (e.g., processor, web service, server, applications, computing device, etc.) not shown in FIG. 4.

Figure 5:
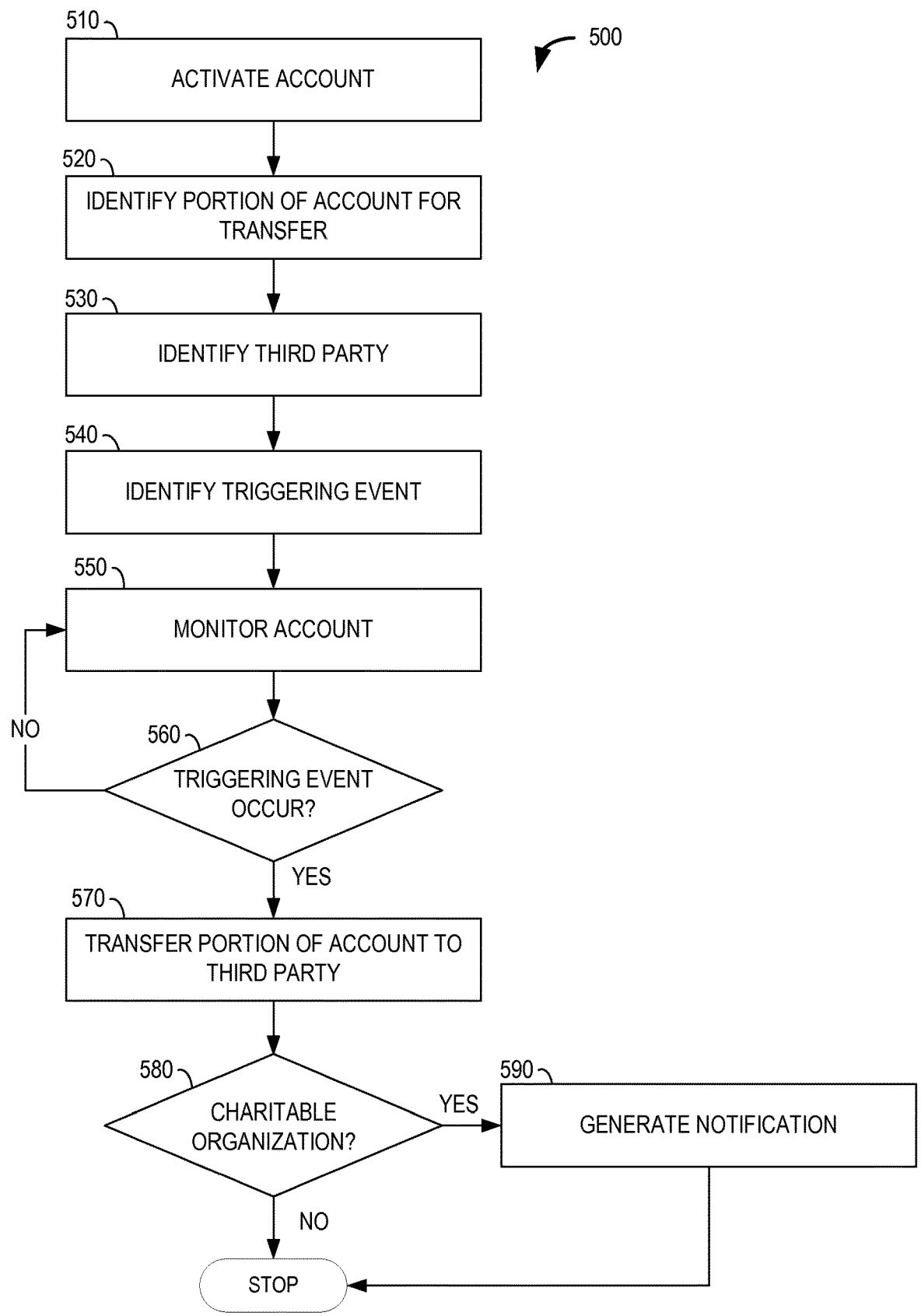
FIG. 5 is a flowchart illustrating an example method of processing a financial transaction using a computing device, such as the computing device shown in FIG. 4.

FIG. 5 is a flowchart illustrating an example method 500 of processing a financial transaction using a computing device 400 (shown in FIG. 4). The computing device 400 activates a financial account 260 at 510. For example, in a prepaid card context, a cardholder 160 may activate the financial account 260 by funding the financial account 260 (e.g., increasing a balance of the financial account 260 from $0). The cardholder 160 may increase a balance of the financial account 260 by adding more funds to the financial account 260 or decrease the balance of the financial account 260 by withdrawing funds from the financial account 260 (e.g., spending money using a payment card 150 associated with the financial account 260).

The cardholder 160 may elect to opt-in to enroll or participate in a positive balance transfer program. Upon opting-in, the computing device 400 identifies a portion of the financial account 260 for transfer to a financial account 260 or 280 associated with a third party (e.g., donation to a charitable organization) at 520. In some embodiments, the cardholder 160 may identify or modify the portion of the financial account 260. For example, the portion of the financial account 260 may be an absolute or fixed amount (e.g., $1) or a relative or variable amount (e.g., 100% of the remaining account balance). Alternatively, the financial account 260 may be automatically in the positive balance transfer program upon setup or activation of a payment card 150 or a financial account 260 associated with the payment card 150. In some embodiments, the cardholder 160 may elect to opt-out from participating in the positive balance transfer program.

In at least some embodiments, the computing device 400 prompts the cardholder 160 to provide information. For example, the computing device 400 may prompt the cardholder 160 to identify a third party (e.g., charitable organization) at 530 and/or identify one or more triggering events at 540. The triggering event may be associated with an inactive or dormant amount of time, a date, and/or a balance of the financial account 260. The cardholder 160 may provide or modify account information at any time that enables the computing device 400 to function as described herein.

The computing device 400 monitors the financial account 260 at 550. In some embodiments, the computing device 400 determines whether a triggering event associated with the financial account 260 has occurred at 560. For example, the financial account 260 may be inactive for a predetermined amount of time, a predetermined date may be reached or satisfied, and/or the balance of the financial account 260 may have decreased to be equal to or less than a predetermined amount. Upon detection of the triggering event, the computing device 400 transfers the portion of the financial account 260 to a financial account 260 or 280 associated with the third party at 570. In at least some embodiments, upon detection of the triggering event, the computing device 400 prompts the user 440 to confirm the transfer of the portion of the financial account 260 to the financial account 260 or 280 associated with the third party prior to transferring the portion of the financial account 260. That is, in at least some embodiments, the computing device 400 transfers the portion of the financial account 260 upon receiving a confirmation of the transfer of the portion of the financial account 260 from the cardholder 160. In this manner, funds likely not to be used (e.g., funds associated with a dormant or inactive card, a card near or at expiration, and/or a card having a relatively low balance) becomes usable by the third party.

In some embodiments, the computing device 400 may determine whether the transfer of the portion of the financial account 260 is a donation to a charitable organization at 580 and/or is a transfer of funds greater than or equal to a predetermined threshold (e.g., a second triggering event). The third party may be determined to be a charitable organization, for example, if the cardholder 160 selected the third party from a list of preapproved charitable organizations. Upon determining that an occurrence of the second triggering event, a notification associated with a transfer of the funds (e.g., a receipt) is generated at 590, presented to the cardholder 160, and/or made available to the cardholder 160. In this manner, the transfer of funds may benefit the cardholder 160 (e.g., via claiming the transfer as a charitable contribution), in addition to the third party. The third party may be determined to be a charitable organization using any combination of mechanisms and/or operations that enables the computing device 400 to function as described herein.

The subject matter described herein enables at least a portion of a financial account to be transferred between a plurality of parties. Upon determining that funds associated with a financial account are not likely to be used (e.g., based on the occurrence or non-occurrence of one or more triggering events), the funds are transferred to a financial account associated with a third party such that the third party may use or have access to the funds. In at least some embodiments, the funds are donated to a charitable organization.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, embodiments of the disclosure are capable of implementation with numerous other general purpose or special purpose computing system environments, configurations, or devices.

Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for transferring at least a portion of a financial account between a plurality of parties. For example, the elements illustrated in FIG. 1, 2, or 4, such as when encoded to perform the operations illustrated in FIG. 3 or 5 constitute at least an example means for receiving an instruction to transfer a portion of a financial account to a financial account associated with a third party, an example means for detecting a triggering event associated with a financial account, and/or an example means for transferring a portion of a financial account to a financial account associated with a third party.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other embodiments described herein, embodiments include any combination of the following:

receiving an instruction to transfer a portion of a financial account to a financial account associated with a third party;

prompting a user to identify one or more triggering events and one or more triggered operations associated with the one or more triggering events;

receiving information associated with the one or more triggered events and the one or more triggered operations;

prompting the user to identify a first triggering event of the one or more triggering events;

receiving an identification of the first triggering event;

prompting the user to identify the first triggering event of the one or more triggering events, the first triggering event associated with an inactive amount of time;

receiving an identification of the first triggering event, the first triggering event associated with the inactive amount of time;

prompting the user to identify the first triggering event of the one or more triggering events, the first triggering event associated with an expiration date;

receiving an identification of the first triggering event, the first triggering event associated with the expiration date;

prompting the user to identify the first triggering event of the one or more triggering events, the first triggering event associated with a balance of the first financial account;

receiving an identification of the first triggering event, the first triggering event associated with the balance of the first financial account;

prompting the user to identify the third party;

receiving an identification of the third party;

prompting the user to identify a portion of the financial account;

receiving an indication of the portion of the financial account;

prompting the user to identify a portion of the financial account, the portion of the financial account being a fixed amount;

receiving an indication of the portion of the financial account, the portion of the financial account being the fixed amount;

prompting the user to identify a portion of the financial account, the portion of the financial account being a variable amount;

receiving an indication of the portion of the financial account, the portion of the financial account being the variable amount;

identifying the portion of the financial account for transfer to the financial account associated with the third party;

prompting the user to increase a balance of the financial account;

receiving an indication to increase the balance;

detecting the first triggering event associated with the financial account;

prompting the user to confirm a transfer of the portion of the financial account;

receiving confirmation of the transfer;

transferring the portion of the financial account to the financial account associated with the third party;

detecting a second triggering event associated with the financial account; and presenting a notification associated with the transfer of the portion of the financial account.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computer-implemented method for processing a financial transaction of a prepaid card in a disparate network comprising a processing computing device, a cardholder computing device and a computing device that maintains a second financial account associated with a third party, the method comprising:

storing, by the processing computing device, data associated with a plurality of financial accounts including a first financial account associated with the prepaid card;

prompting, by the processing computing device and via an interface with the cardholder computing device, a cardholder to provide information associated with: the third party, one or more triggering events, and one or more operations associated with the one or more triggering events;

receiving, by the processing computing device and via the interface with the cardholder computing device, a selection of a triggering event, from the one or more triggering events, from the cardholder comprising a balance of the first financial account associated with the prepaid card being less than a threshold prior to an expiration date associated with the prepaid card;

receiving, by the processing computing device and via the interface with the cardholder computing device, an identification of the third party from the cardholder;

receiving, by the processing computing device and via the interface with the cardholder computing device, a selection from the cardholder of the one or more operations that enables transferring a portion of the first financial account to the second financial account associated with the third party;

detecting, by the processing computing device, an occurrence of the triggering event; and upon detection of the triggering event, performing the one or more operations to transfer, by the processing computing device, the portion of the first financial account to the second financial account associated with the third party at least by transferring the portion of the first financial account to a computing device that maintains the second financial account associated with the third party.

2. The computer-implemented method of claim 1, wherein the threshold is selected by the processing computing device, and wherein the selecting by the processing computing device comprises:

accessing historical data of the cardholder;

based on the historical data, determining a likelihood of the cardholder using the balance less than the threshold; and selecting the threshold based on the determined likelihood of the cardholder using the balance less than the threshold.

3. The method of claim 1, wherein the one or more triggering events further comprise an inactive amount of time associated with the prepaid card.

4. The method of claim 1, wherein the one or more triggering events further comprise the expiration date associated with the prepaid card.

5. The method of claim 1, wherein the one or more triggering events further comprise a balance of the first financial account associated with the prepaid card.

6. The method of claim 1, wherein the information further comprises an identification of the portion of the first financial account being a fixed amount.

7. The method of claim 1, wherein the information further comprises an identification of the portion of the first financial account, the portion of the first financial account being a variable amount.

8. The computer-implemented method of claim 1, further comprising:
accessing, by the processing computing device, a database comprising a list of preapproved third parties; and
determining, by the processing computing device, an identified third party as one of the preapproved third parties.

9. The computer-implemented method of claim 1, further comprising:
receiving, by the processing computing device and via the interface with the cardholder computing device, a selection from the cardholder of an additional triggering event, from the one or more triggering events, comprising the second financial account being identified as a charity;
detecting, by the processing computing device, an additional triggering event; and
upon detection of the additional triggering event, presenting a receipt associated with the transfer of the portion of the first financial account to the second financial account.

10. The computer-implemented method of claim 1, further comprising prompting, by the processing computing device and via the interface with the cardholder computing device, the cardholder to confirm the transfer of the portion of the first financial account, wherein transferring the portion comprises transferring by the processing computing device, the portion of the first financial account upon receiving confirmation of the transfer.

11. The computer-implemented method of claim 1, further comprising:
receiving, by the processing computing device and via an interface with the cardholder computing device, an identification of the portion of the first financial account from the cardholder.

12. The computer-implemented method of claim 11, wherein the portion of the first financial account comprises the balance of the first financial account associated with the prepaid card.

13. A computing device for processing a financial transaction of a prepaid card in a disparate network comprising the computing device, a cardholder computing device and a computing device that maintains a second financial account associated with a third party, the computing device comprising:
a memory storing data associated with a plurality of financial accounts including a first financial account associated with the prepaid card and computer-executable instructions; and
a processor configured to execute the computer-executable instructions to:
prompt via an interface with the cardholder computing device, a cardholder to provide information associated with: the third party, one or more triggering events, and one or more operations associated with the one or more triggering events;
receive, via the interface with the cardholder computing device, a selection of a triggering event, from the one or more triggering events, from the cardholder comprising a balance of the first financial account associated with the prepaid card being less than a threshold prior to an expiration date associated with the prepaid card;
receive, via the interface with the cardholder computing device, an identification of the third party from the cardholder;
receive, via the interface with the cardholder computing device, a selection from the cardholder of the one or more operations that enable transferring a portion of the first financial account to the second financial account associated with the third party;
detect an occurrence of the triggering event; and
upon detection of the triggering event, perform the one or more operations to transfer the portion of the first financial account to the second financial account associated with the third party at least by transferring the portion of the first financial account to the computing device that maintains the second financial account associated with the third party.

14. The computing device of claim 13, wherein the processor is further configured to execute the computer-executable instructions to prompt, via the interface with the cardholder computing device, the cardholder to identify a charitable organization.

15. The computing device of claim 13, wherein the processor is further configured to execute the computer-executable instructions to prompt via the interface with the cardholder computing device, the cardholder to increase a balance of the first financial account.

16. The computing device of claim 13, wherein the processor is further configured to execute the computer-executable instructions to prompt, via the interface with the cardholder computing device, the cardholder to select one of the one or more triggering events.

17. The computing device of claim 13, wherein the processor is further configured to execute the computer-executable instructions to prompt, via the interface with the cardholder computing device, the cardholder to identify one of a fixed amount and a variable amount as the portion to transfer from the first financial account to the second financial account associated with the third party.

18. A non-transitory computer readable media for processing a financial transaction of a prepaid card in a disparate network comprising a computing device, a cardholder computing device and a computing device that maintains a second financial account associated with a third party, the non-transitory computer readable media having computer-executable instructions embodied thereon, wherein, upon execution by at least one processor of the computing device, the computer-executable instructions cause the processor of the computing device to:
store data associated with a plurality of financial accounts including a first financial account associated with the prepaid card;
prompt, via an interface with the cardholder computing device, a cardholder to provide information associated with: the third party, one or more triggering events, and one or more operations associated with the one or more triggering events;
receive, via the interface with the cardholder computing device, a selection of a triggering event, from the one or more triggering events, from the cardholder comprising a balance of the first financial account associated with the prepaid card being less than a threshold prior to an expiration date associated with the prepaid card;
receive, via the interface with the cardholder computing device, an identification of the third party from the cardholder;
receive, via the interface with the cardholder computing device, a selection from the cardholder of the one or more operations that enable transferring a portion of the first financial account to the second financial account associated with the third party;

detect an occurrence of the triggering event; and upon detection of the triggering event, perform the one or more operations to transfer the portion of the first financial account to the second financial account associated with the third party at least by transferring the portion of the first financial account to the computing device that maintains the second financial account associated with the third party.

19. The non-transitory computer readable media of claim 18, wherein, upon execution by the at least one processor of the computing device, the computer-executable instructions further cause the processor to prompt, via the interface with the cardholder computing device, the cardholder to provide information associated with the transfer to the third party, the information including one or more of an indication to increase the balance of the first financial account and an identification of one of a fixed amount and a variable amount to transfer to the third party.

20. The non-transitory computer readable media of claim 18, wherein, upon execution by the at least one processor of the computing device, the computer-executable instructions further cause the processor to: detect a second triggering event of the one or more triggering events; and upon detection of the second triggering event, present a receipt associated with the transfer of the portion of the first financial account to the second financial account.

* * * * *